(12) United States Patent
Koo

(10) Patent No.: US 10,697,136 B2
(45) Date of Patent: Jun. 30, 2020

(54) BRIDGE STRUCTURE

(71) Applicant: John C Koo, Glendale, CA (US)

(72) Inventor: John C Koo, Glendale, CA (US)

(*) Notice: Subject to any disclaimer, the term of this patent is extended or adjusted under 35 U.S.C. 154(b) by 0 days.

(21) Appl. No.: 15/858,870

(22) Filed: Dec. 29, 2017

(65) Prior Publication Data

US 2019/0203433 A1 Jul. 4, 2019

(51) Int. Cl.

| *E01D 6/00* | (2006.01) |
| *G01M 5/00* | (2006.01) |
| *H02S 20/21* | (2014.01) |
| *H02S 20/20* | (2014.01) |
| *E01D 101/30* | (2006.01) |

(52) U.S. Cl.
CPC ............ *E01D 6/00* (2013.01); *G01M 5/0008* (2013.01); *G01M 5/0066* (2013.01); *H02S 20/20* (2014.12); *H02S 20/21* (2014.12); *E01D 2101/30* (2013.01)

(58) Field of Classification Search
CPC ....... E01D 6/00; E01D 2101/30; H02S 20/20; H02S 20/21; G01M 5/0008; G01M 5/0066
See application file for complete search history.

(56) References Cited

U.S. PATENT DOCUMENTS

| 1,472,055 | A | * | 10/1923 | Drake | ............... | E01D 2/02 |
| | | | | | | 14/74.5 |
| 1,889,512 | A | * | 11/1932 | Auten | ............... | E04B 7/02 |
| | | | | | | 52/643 |
| 1,970,979 | A | * | 8/1934 | Robb | ............... | E01D 6/00 |
| | | | | | | 14/77.1 |
| 2,151,267 | A | * | 3/1939 | Finsterwalder | ............... | E01D 6/00 |
| | | | | | | 52/650.2 |
| 3,027,633 | A | * | 4/1962 | Murphy | ............... | E01D 21/06 |
| | | | | | | 14/4 |
| 4,129,917 | A | * | 12/1978 | Sivachenko | ............... | E01D 2/04 |
| | | | | | | 14/6 |
| 4,649,588 | A | * | 3/1987 | Taylor | ............... | E01D 6/00 |
| | | | | | | 14/3 |
| 4,912,795 | A | * | 4/1990 | Johnson | ............... | E01D 6/00 |
| | | | | | | 14/3 |
| 5,655,244 | A | * | 8/1997 | Minakami | ............... | B61B 15/00 |
| | | | | | | 104/18 |

(Continued)

OTHER PUBLICATIONS

Marr, Jeff, Scour Monitoring Technology Implementation, Sep. 2014, pp. 23-25. (Year: 2014).*

*Primary Examiner* — Abigail A Risic
(74) *Attorney, Agent, or Firm* — Tommy S F Wang; Wang IP Law Group, P.C.

(57) ABSTRACT

A bridge structure comprises a first supporting structure, at least one first hollow tube and a first monitor. The first supporting structure comprises bases, first pillars, a first platform. The first pillars are coupled to the bases, wherein each of the first pillars comprises first pillar chords and first pillar girders formed as first pillar trusses with the first pillar chords. The first platform is coupled to the first pillars, wherein the first platform comprises a first supporting plane, first platform chords and first platform girders formed as first platform trusses with the first platform chords. The at least one first hollow tube is located between the first pillar trusses or the first platform trusses. The first monitor is located in the at least one first hollow tube, wherein the first monitor is capable of monitoring a bridge stability.

19 Claims, 12 Drawing Sheets

(56) References Cited

U.S. PATENT DOCUMENTS

| | | | | |
|---|---|---|---|---|
| 6,574,818 B1* | 6/2003 | Matiere | E01D 2/04 | 14/73 |
| 6,647,161 B1* | 11/2003 | Hodge | G01B 11/16 | 385/12 |
| 7,210,183 B2* | 5/2007 | Kornatsky | E01C 1/002 | 14/77.1 |
| 7,275,348 B2* | 10/2007 | Desutter | E04B 1/06 | 52/223.8 |
| 7,401,371 B2* | 7/2008 | Kornatsky | E01C 1/002 | 14/77.1 |
| 2001/0050032 A1* | 12/2001 | Dry | C04B 22/006 | 106/677 |
| 2004/0143397 A1* | 7/2004 | Paulson | G01N 29/14 | 702/14 |
| 2005/0116833 A1* | 6/2005 | Miller | G01M 5/0008 | 340/690 |
| 2006/0272267 A1* | 12/2006 | Mentado-Duran | E01D 2/00 | 52/693 |
| 2009/0214291 A1* | 8/2009 | Farr | E01C 1/002 | 404/1 |
| 2009/0241452 A1* | 10/2009 | Hillman | E01D 2/02 | 52/309.17 |
| 2010/0043153 A1* | 2/2010 | Lerner | E01D 6/00 | 14/6 |
| 2010/0180524 A1* | 7/2010 | Jilken | E04B 1/0023 | 52/173.3 |
| 2010/0206303 A1* | 8/2010 | Thorne | H01L 31/0547 | 126/696 |
| 2010/0242609 A1* | 9/2010 | Lee | G01M 5/0008 | 73/594 |
| 2011/0005165 A1* | 1/2011 | Stadthagen-Gonzalez | E04C 2/326 | 52/783.1 |
| 2011/0131740 A1* | 6/2011 | Wong | E01D 1/00 | 14/78 |
| 2011/0146753 A1* | 6/2011 | Johnson | H02S 30/10 | 136/246 |
| 2012/0060306 A1* | 3/2012 | Wallerstrom | E01D 19/02 | 14/73.5 |
| 2012/0173150 A1* | 7/2012 | Romero | G01S 13/885 | 702/14 |
| 2013/0047544 A1* | 2/2013 | Dayton | E04H 12/10 | 52/634 |
| 2014/0067284 A1* | 3/2014 | Breed | B60R 21/0152 | 702/34 |
| 2018/0202162 A1* | 7/2018 | Charest | E04C 3/291 | |
| 2019/0153683 A1* | 5/2019 | Southworth | E01D 6/00 | |

* cited by examiner

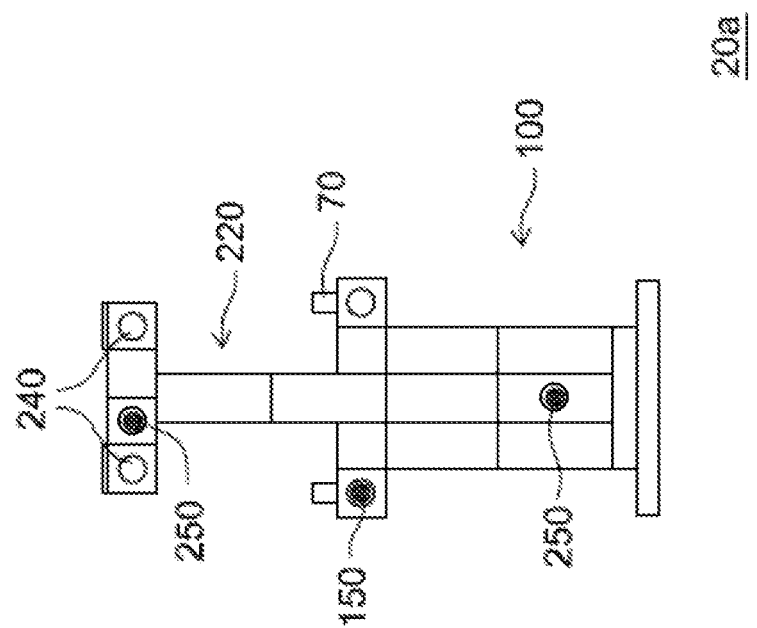

ns, and more particularly, to a bridge struc-
BRIDGE STRUCTURE

TECHNICAL FIELD OF THE INVENTION

The present application generally relates to bridge structures, and mere particularly, to a bridge structure with artificial intelligence for vehicles powered by electricity.

BACKGROUND OF THE INVENTION

Generally, a bridge is made for connecting two separate places and can support different kinds of vehicles. Specifically, in order to support heavy vehicles such as bus, train or truck, the bridge used to utilize heavy materials like cement. However, not only the manufacturing process is environment unfriendly, but the structural stability of the bridge also cannot fit every vehicle since the weight range of all vehicles is too wide.

In addition, traditional bridge is also required regular inspection and maintenance, causing, inconvenience for passers-by and even making cost be higher. Therefore, a need remains for a bridge structure to provide a safer, more environment friendly and more convenient bridge for every user.

SUMMARY OF THE INVENTION

The present application discloses a bridge structure to provide a safer, more environment friendly and more convenient bridge for every user.

A bridge structure comprises a first supporting structure, at least one first hollow tube and a first monitor. The first supporting structure comprises a plurality of bases a plurality of first pillars, a first platform. The plurality of first pillars are coupled to the plurality of bases, wherein each of the first pillars comprises a plurality of first pillar chords and a plurality of first pillar girders formed as first pillar trusses with the plurality of first pillar chords. The first platform coupled to the plurality of first pillars, wherein the first platform comprises a first supporting plane, a plurality of first platform chords and a plurality of first platform girders formed as first platform trusses with the plurality of first platform chords. The at least one first hollow tube is located between the first pillar trusses or the first platform trusses. The first monitor is located in the at least one first hollow tube, wherein the first monitor is capable of monitoring a bridge stability.

In various exemplary embodiments, the first hollow tube is a pneumatic tube.

In various exemplary embodiments, the first supporting structure further comprises a plurality of solar panels located at the exterior of the plurality of the first pillars.

In various exemplary embodiments, the first supporting structure further comprises a plurality of solar panels located at the bottom and side surfaces of the first platform.

In various exemplary embodiments, the first pillar trusses are wrapped by solar fabrics.

In various exemplary embodiments, the first platform trusses are wrapped by solar fabrics.

In various exemplary embodiments, the first monitor comprises noise sensor, vibration sensor and seismic movement sensor.

According to an exemplary embodiment of the bridge structure, further comprising a second supporting structure, at least one second hollow tube and a second monitor. The second supporting structure comprises a plurality of second pillars and a second platform. The plurality of second pillars is coupled to the plurality of bases, wherein each of the second pillars comprises a plurality of second pillar chords and a plurality of second pillar girders formed as second pillar trusses with the plurality of second pillar chords. The second platform is coupled to the plurality of second pillars, wherein the second platform comprises a second supporting plane, a plurality of second platform chords and a plurality of second platform girders formed as second platform trusses with the plurality of second platform chords. The at least one second hollow tube is located between the second pillar trusses or the second platform trusses. The second monitor is located in the at least one second hollow tube, wherein the second monitor is capable of monitoring a bridge stability.

In various exemplary embodiments, the second hollow tube is a pneumatic tube.

In various exemplary embodiments, the second supporting structure further comprises a plurality of solar panels located at the exterior of the plurality of the second pillars.

In various exemplary embodiments, the second supporting structure further comprises a plurality of solar panels located at the bottom and side surfaces of the second platform.

In various exemplary embodiments, the second pillar trusses are wrapped by solar fabrics.

In various exemplary embodiments, the second platform trusses are wrapped by solar fabrics.

In various exemplary embodiments, the second monitor comprises noise sensor, vibration sensor and seismic movement sensor.

According to the other exemplary embodiment of the bridge structure, farther comprising a third supporting structure, at least one third hollow tube and a third monitor. The third supporting structure comprises a plurality of third pillars and a third platform. The plurality of third pillars is coupled to the first platform, wherein each of the third pillars comprises a plurality of third pillar chords and a plurality of third pillar girders formed as third pillar trusses with the plurality of third pillar chords. The third platform is coupled to the plurality of third pillars, wherein the third platform comprises a third supporting plane, a plurality of third platform chords and a plurality of third platform girders formed as third platform trusses with the plurality of third platform chords. The at least one third hollow tube is located between the third pillar trusses or the third platform trusses. The third monitor is located in, the at least one third hollow tube, wherein the third monitor is capable of monitoring a bridge stability.

In various exemplary embodiments, the third supporting structure further comprises a plurality of solar panels located at the exterior of the plurality of the third pillars.

In various exemplary embodiments, the third supporting structure further comprises a plurality of solar panels located at the bottom and side surfaces of the third platform.

In various exemplary embodiments, the third pillar trusses are wrapped by solar fabrics.

In various exemplary embodiments, the third platform trusses are wrapped by solar fabrics.

In various exemplary embodiments, the third monitor comprises noise sensor, vibration sensor and seismic movement sensor.

Based on the above, the present application allows users to have a safer bridge structure since the monitors with artificial intelligence may inspect the bridge stability. In other words, the bridge structure of the present application may work as a micro transit for the users. In addition, since the bridge structure of the present application is a truss framing structure, providing a cheaper and environment friendly manufacturing process and a more flexible overall structure as a "structure tree transporter." For example, the bridge structure may have one, two, three or more layers and can have hollow tubes between the trusses for installing the monitors.

Furthermore, since the solar fabrics may also generate energy for the transport system, providing a convenient environment for those vehicles powered by electricity.

Numerous other advantages and features of the present application will become readily apparent from the following detailed description of disclosed embodiments, from the claims and from the accompanying drawings.

BRIEF DESCRIPTION OF THE DRAWINGS

The objects, features and advantages of the present application will be more readily appreciated upon reference to the following disclosure when considered in conjunction with the accompanying drawings, wherein like reference numerals are used to identify identical components in the various views, and wherein reference numerals with alphabetic characters are utilized to identify additional types, instantiations or variations of a selected component embodiment in the various views, in which:

FIG. 3B is a front view thereof.

DETAILED DESCRIPTION OF DISCLOSED EMBODIMENTS

Figure 1A:
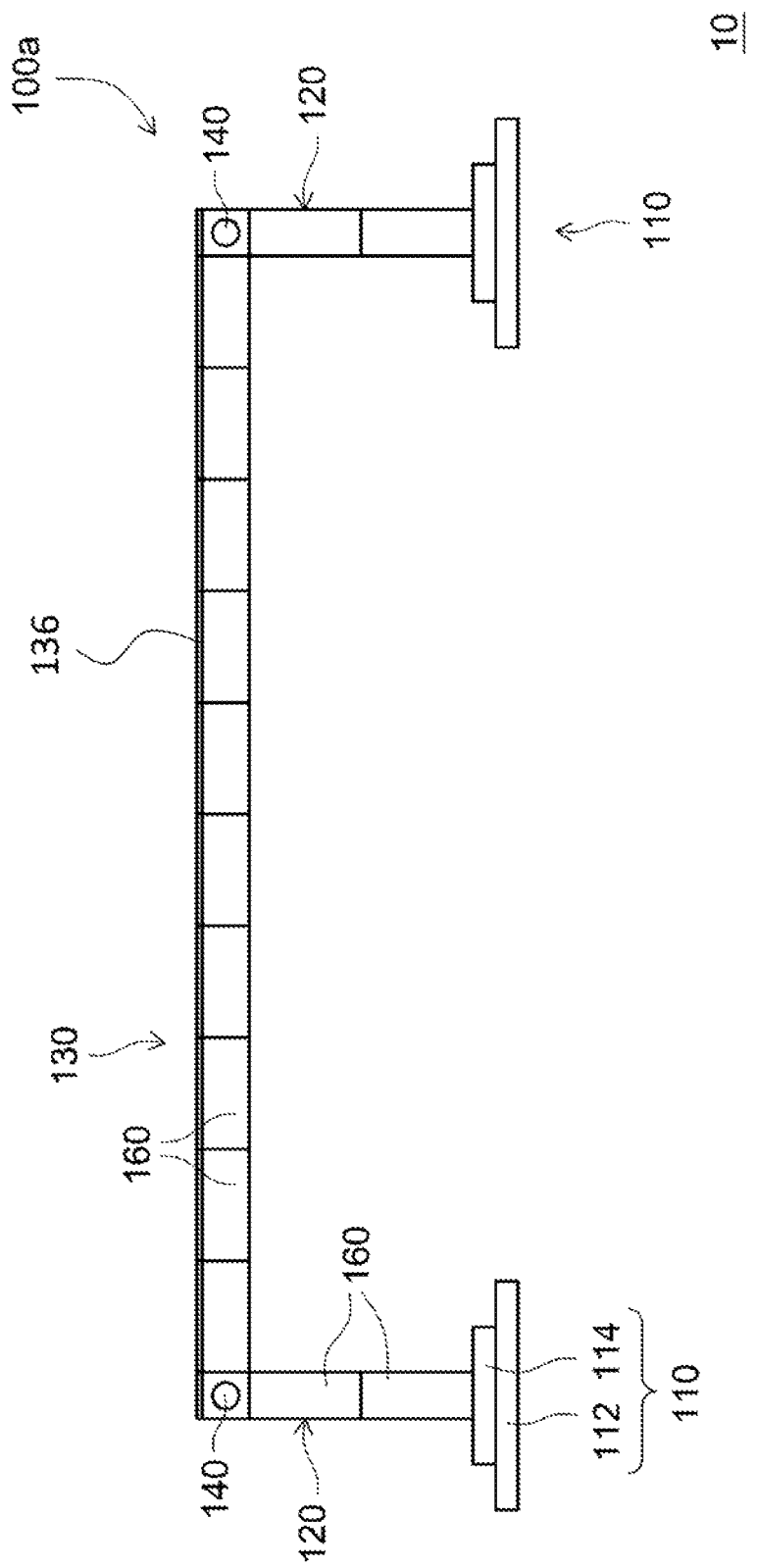
FIG. 1A is a side view of a bridge structure according to a first embodiment of the present application.

Reference will now be made in detail to the present representative embodiments of the present application, examples of which are illustrated in the accompanying drawings. Wherever possible, the same reference numbers are used in the drawings and the description to refer to the same or like parts.

Figure 1B:
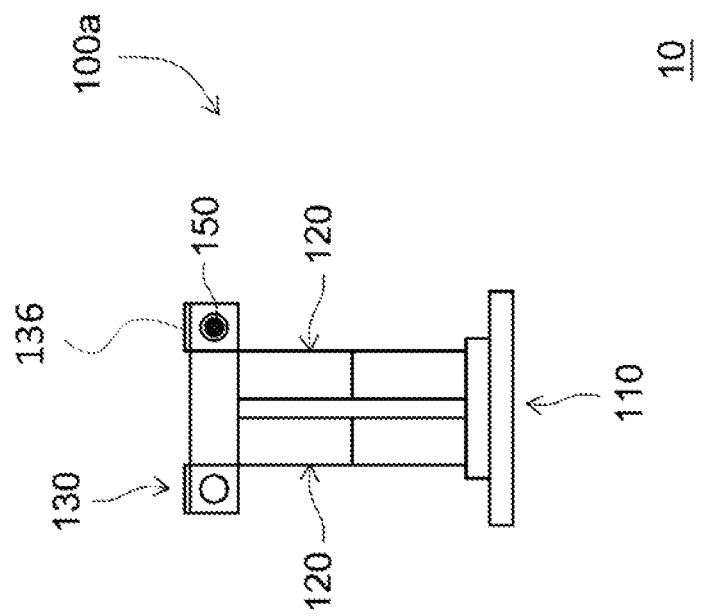
FIG. 1B is a front view thereof.

FIG. 1A is a side view of a bridge structure 10 according to a first embodiment of the present application. FIG. 1B is a front view thereof.

Referring to FIGS. 1A-1B, the bridge structure 10 comprises a supporting structure 100a, at least one hollow tube 140, a monitor 150 and a plurality of solar panels 160. The supporting structure 100a comprises a plurality of bases 110, a plurality of pillars 120 and a platform 130. The pillars 120 are coupled to the bases 110. The platform 130 is coupled to the pillars 120. Specifically, each of the bases 110 comprises a bottom layer 112 and a top layer 114. The width and the length of the bottom layer 112 are 20 feet and the height is 2 feet. The width and length of the top layer 114 is 10 feet and the height is 2 feet. The width and the length of each of the pillars 120 are 4 feet and the height is 16 feet. The width of the platform 130 is 18 feet, the length of the platform 130 is 100 feet and the height of the platform 130 is 4 feet. By the above structure, the overall structure may be more stable. However, the value of the width, length and height is not limited in the present application.

The hollow tube 140 can be any kind of tube as long as the monitor can be installed therein. The hollow tube 140 of the present application is a pneumatic tube as an example. The solar panels 160 are located at the exterior of the pillars 120 and the bottom and side surfaces of the platform 130. Specifically, the solar panels 160 are transparent and cover the substantial exterior surfaces of the bridge structure 10 for generating energy. The energy generated from the solar panels may be stored in large capacity storage batteries placed at the bottom of each bases 110. Therefore, the electric vehicles (EV) may be charged via EV charging ports (not shown) from the storage batteries.

Figure 1C:
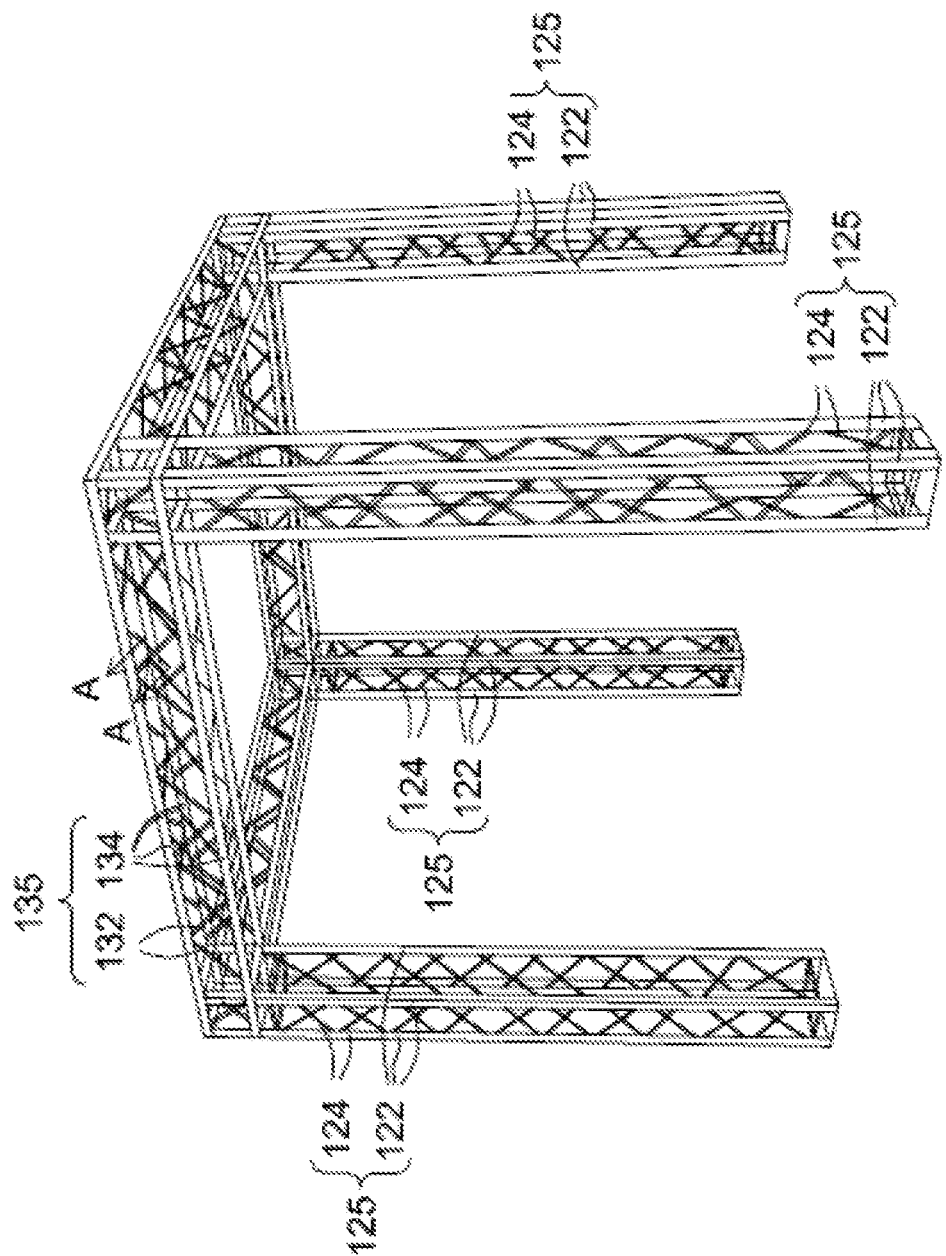
FIG. 1C is a perspective view showing pillar trusses and platform trusses of the bridge structure.
Figure 1D:
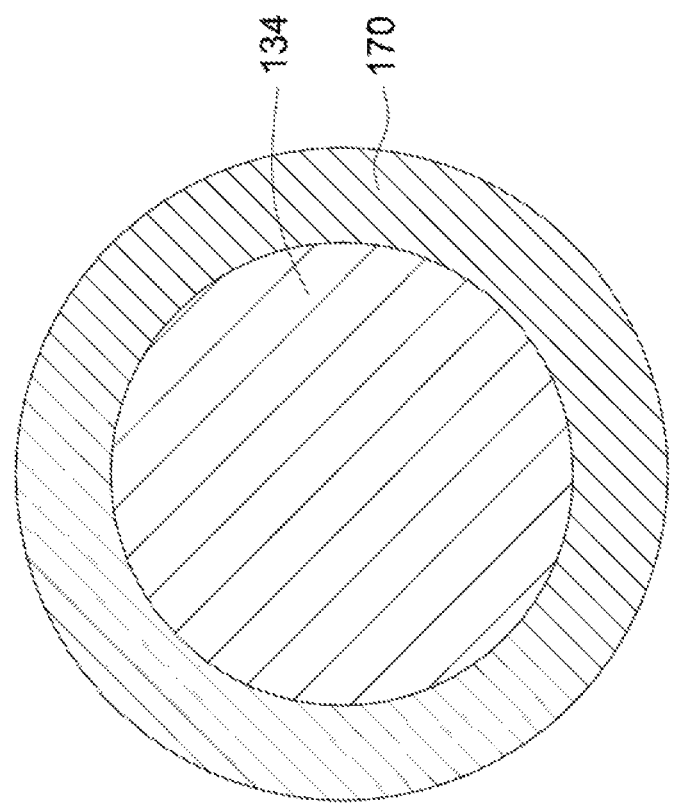
FIG. 1D a cross-sectional view thereof taken along the line 1D-1D of FIG. 1C.

FIG. 1C is a perspective view showing pillar trusses and platform trusses of the bridge structure. FIG. 1D a cross-sectional view thereof taken along the line 1D-1D of FIG. 1C.

Referring to FIGS. 1A-1D, the pillars 120 and the platform 132 comprises trusses. Specifically, FIG. 1C shows the pillars 120 and the platform 132 with the solar panels 160 and the supporting plane 136 being removed. Each of the pillars 120 comprises pillar chords 122 and pillar girders 124 formed as pillar trusses 125 with the pillar chords 122. In addition, the platform 130 comprises the supporting plane 136, platform chords 132 and platform girders 134 formed as platform trusses 135 with the platform chords 132.

Therefore, the structure of truss framing enables lighter weight long span bridging capability, and simultaneously creating a large diameter hollow interior space for installing elements such as the monitor.

The material of the trusses is ASTM A572 grade 65 KS steel. However, the material is not limited, the material of the trusses 125/135 may be fiberglass reinforced material or superior lightweight alloys as long as the interior hollow space is maintained.

In addition, the trusses and hollow structure enables long span across intersections to avoid traffic signal and utility impacts, not only increasing the speed of installation but lowering down the cost.

FIG. 1D shows that the platform girders 134 are wrapped by solar fabrics 134. It should be noted that although FIG. 1D only shows that the platform girders 134 are wrapped by solar fabrics 134, the platform chords 132, the pillar girders 124 and the pillar chords 122 may also be wrapped by solar fabrics 170. By doing so, the solar fabrics 170 may generate more energy for vehicles powered by electricity or for LED during night. Therefore, the bridge structure 10 of the present application is suitable for resting on street or parking lanes for improving the light during night and the beauty of the cityscape. For resting near parking lanes, the bridge structure 10 of the present application may also be coupled to the automated parking structure as the way to load and unload EVES and autonomous guided vehicles (AGV). However, the present application is not limited thereto, the generated energy may also be used in other application if needed.

Figure 2:
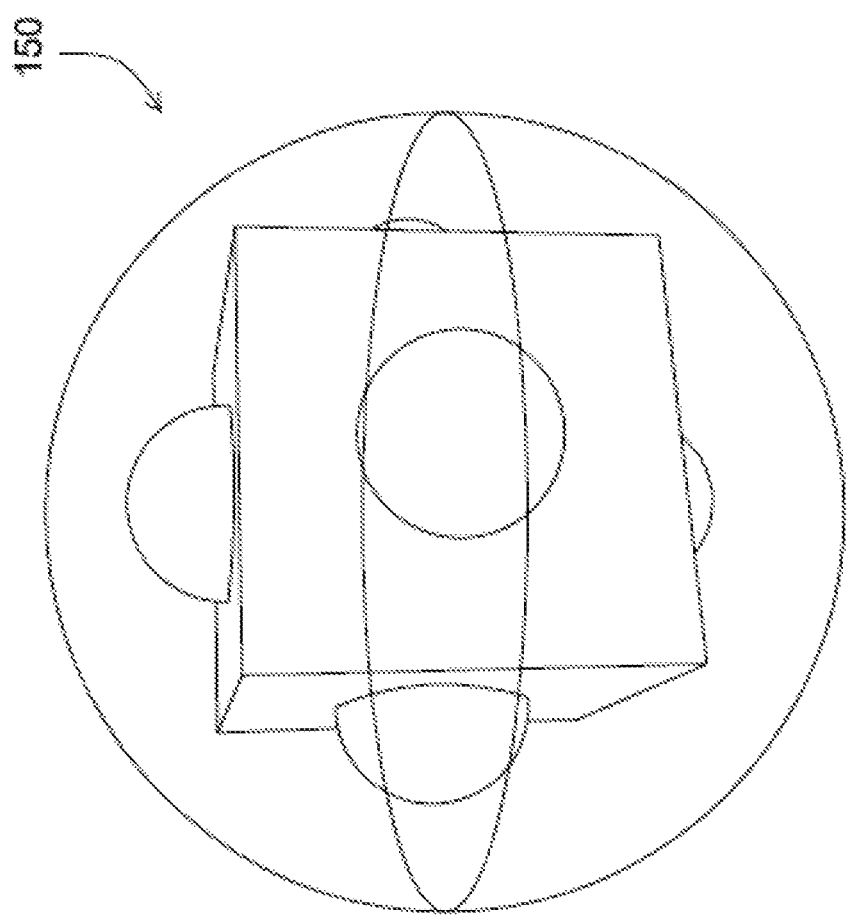
FIG. 2 is a perspective view of one monitor according to the present application.

FIG. 2 is a perspective view of one monitor 150 according to the present application.

Referring to FIG. 2, the monitor 150 is capable of monitoring a bridge stability and comprises noise sensor, vibration sensor and seismic movement sensor. In addition, the monitor 150 may also comprise GAPS, Wifi, gyroscope, accelerometer or GPU. Therefore, the bridge structure 10 of the present application allows users to have a safer bridge structure since the monitors 150 may inspect the bridge stability. Furthermore, the monitor 150 may also suggest the drivers for charging time at the power station by collecting the data from previous vehicles.

Figure 3A:
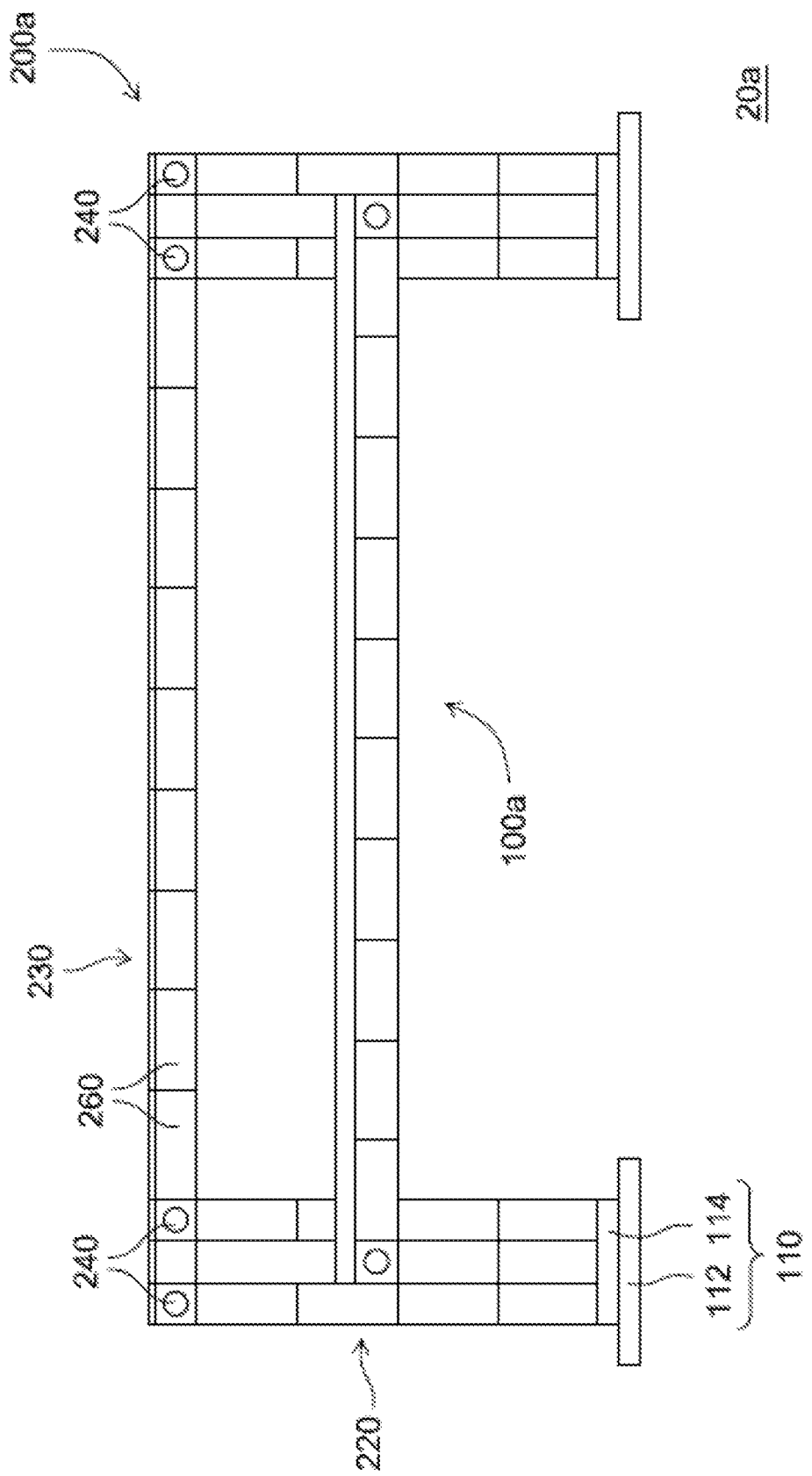
FIG. 3A is a side view of a bridge structure according to a second embodiment of the present application.

FIG. 3A is a side view of a bridge structure 20a according to a second embodiment of the present application. FIG. 3B is a front view thereof.

The differences between the bridge structure 20a and the bridge structure 10 (referring to FIG. 1A) are the double layer of the supporting structure, the location of the monitor and the size of the bases.

The bridge structure 20a further comprises a second supporting structure 200a, at least one hollow tube 240 and monitors 250. The supporting structure 200a comprises pillars 220, a platform 230 and solar panels 260. The pillars 220 are coupled to the bases 212.

The width and the length of the bottom layer 112 of the bridge structure 20a are 25 feet and the height is 25 feet. The width and length of the top layer 114 of the bridge structure 20a is 10 feet and the height is 2 feet. The width and the length at each of the pillars 220 are 4 feet and the height is 32 feet. The width of die platform 330 is 16 feet, the length of the platform 130 is 100 feet and the height of the platform 130 is 4 feet. By the above structure, the overall structure may be more stable for double supporting structure. However, the value of the width, length and height is not limited in the present application.

The bridge structure 20a comprises the monitors 250 located within the pillars 220 and the platform 230 of the supporting structure 200a. Specifically, the monitors 250 located inside the hollow tube 240.

Figure 3C:
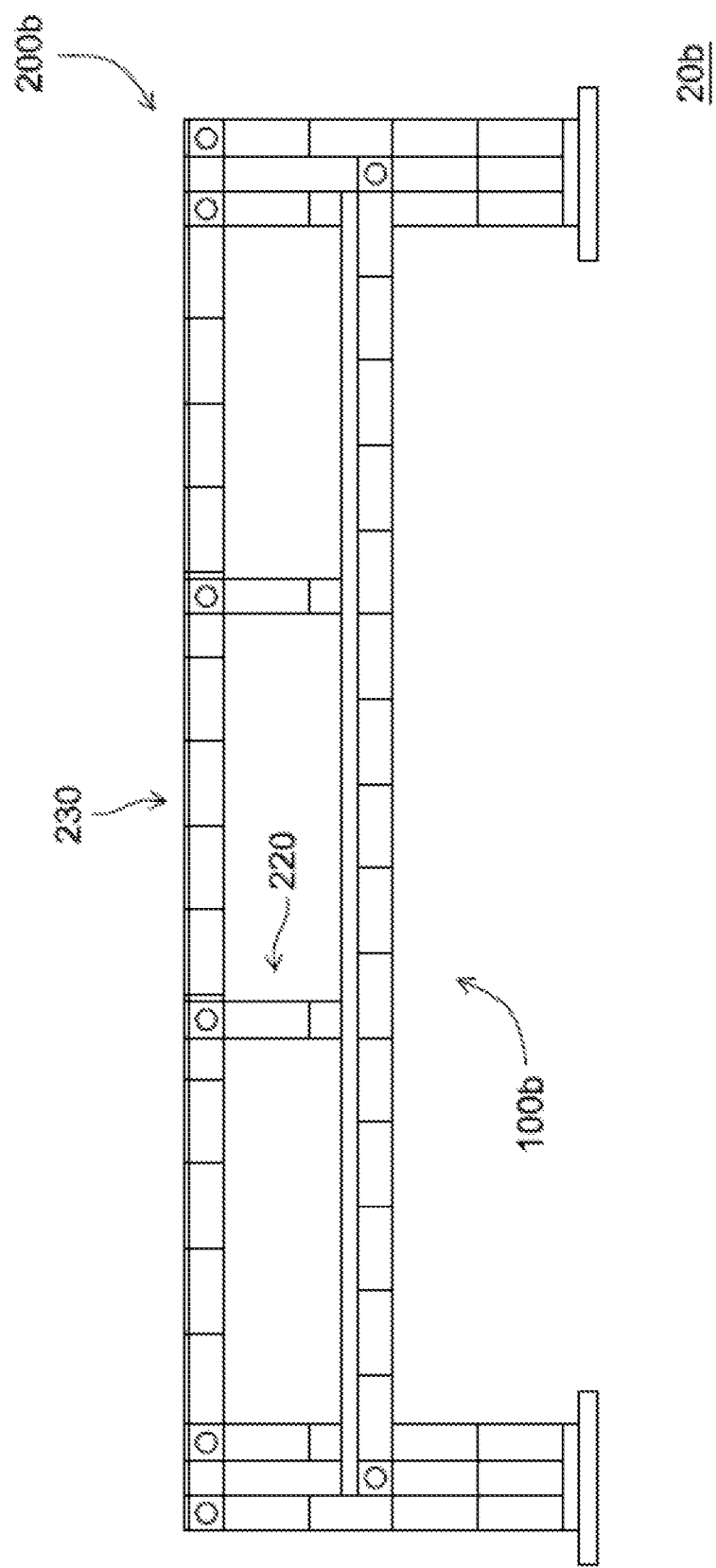
FIG. 3C is a side view of a bridge structure according to a third embodiment of the present application.

FIG. 3C is a side view of a bridge structure 20b according to a third embodiment of the present application.

The difference between the bridge structure 20a and the bridge structure 20b is the length of a supporting structure 100b, the length of a supporting structure 200b and the number of pillars of the supporting structure 200b.

Specifically, the length of the supporting structures 100b/200b are 150 feet. In addition, the supporting structure 200b has more pillars 220 for supporting longer platform 230 as shown in FIG. 3C.

Figure 3D:
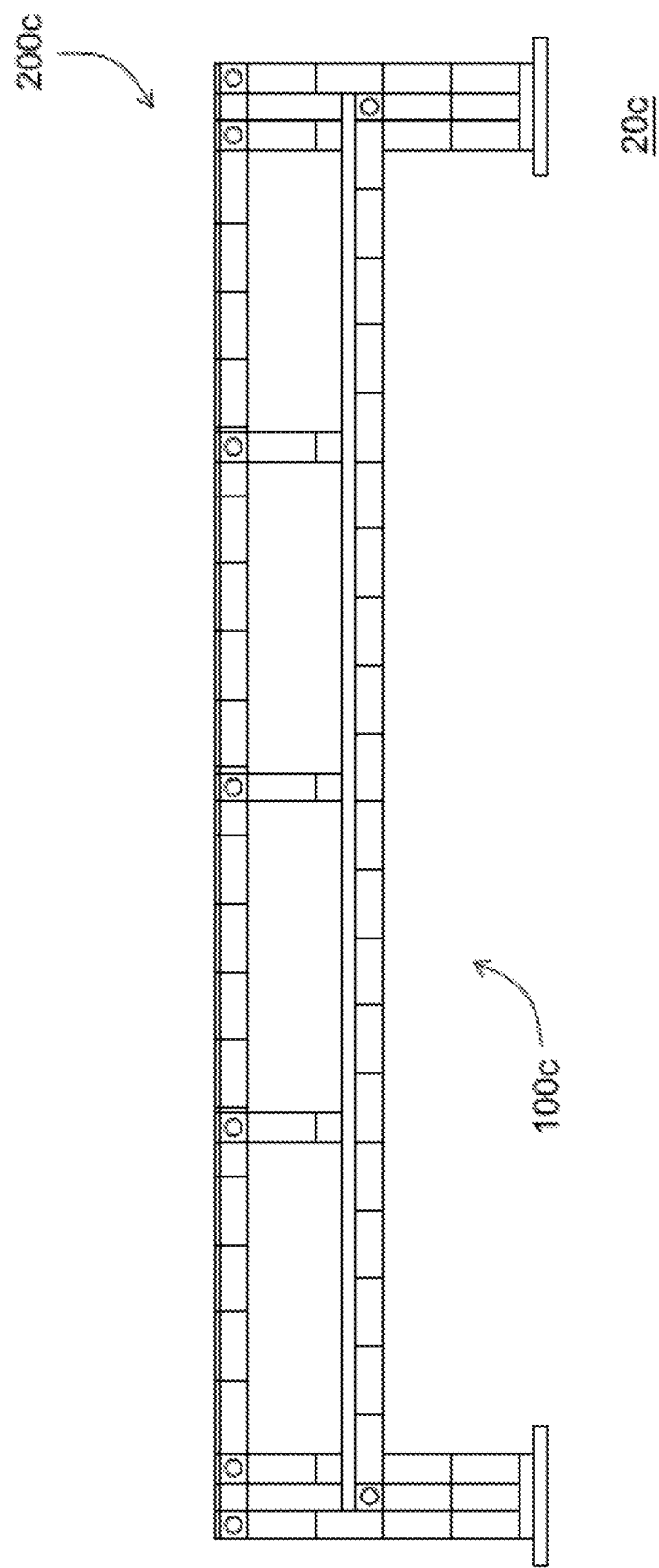
FIG. 3D is a side view of a bridge structure according to a fourth embodiment of the present application.

FIG. 3D is a side view of a bridge structure 20c according to a fourth embodiment of the present application.

The difference between the bridge structure 20a and the bridge structure 20c is the length of a supporting structure 100c, the length of a supporting structure 200c and the number of pillars of the supporting structure 200c.

Specifically, the length of the supporting structures 100c/200c are 200 feet. In addition, the supporting structure 200c has more pillars 220 for supporting longer platform 230 as shown in FIG. 3D.

Figure 4A:
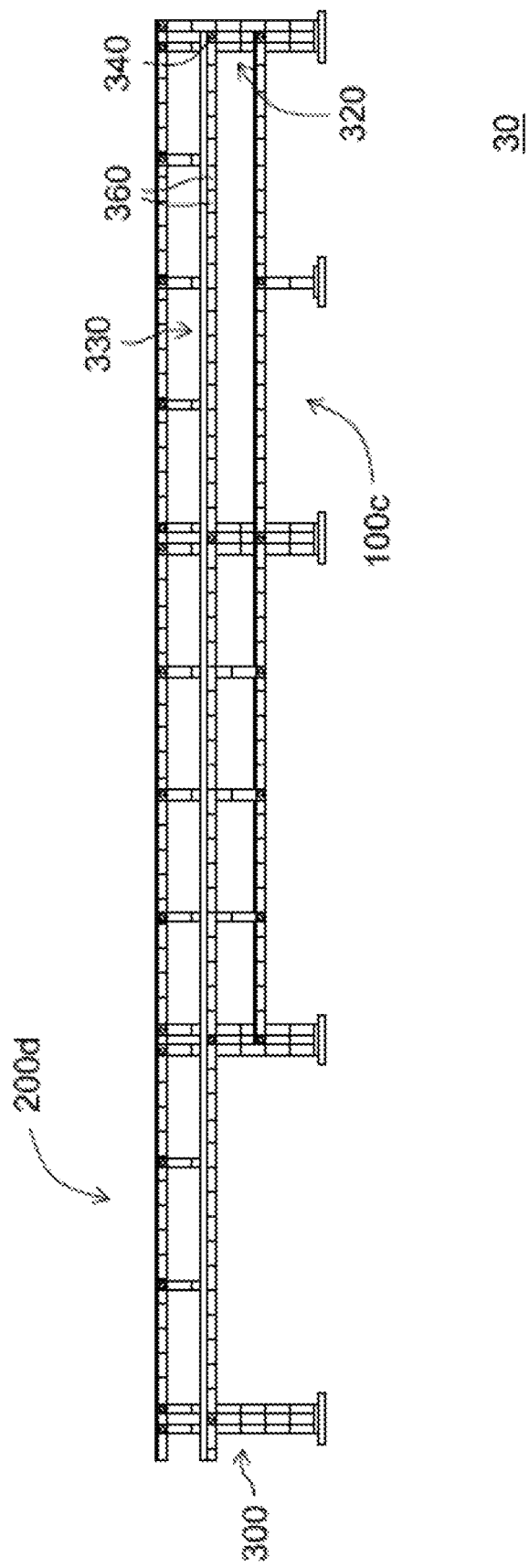
FIG. 4A is a side view of a bridge structure according to a fifth embodiment of the present application.
Figure 4B:
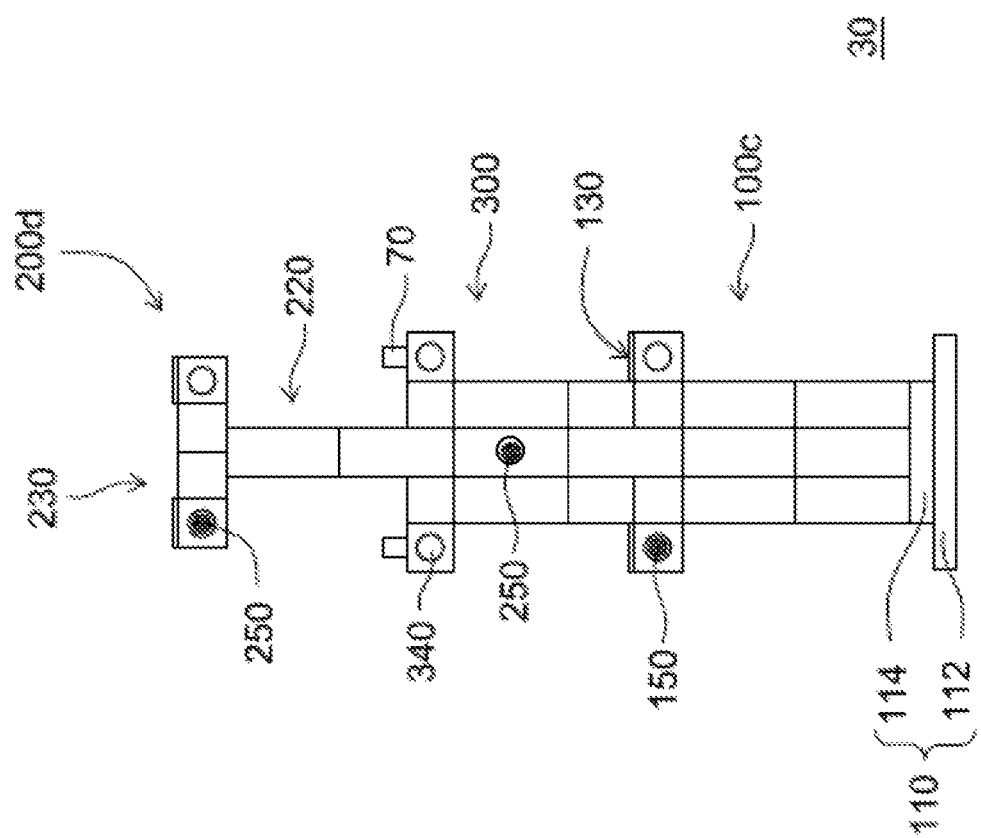
FIG. 4B is a front view thereof.

FIG. 4A is a side view of a bridge structure 30 according to a fifth embodiment of the present application. FIG. 4B is a front view thereof.

The differences between the bridge structure 30 and the bridge structure 20c are the triple layer of the supporting structure, the height of the second supporting structure, the location of the monitor and the size of the bases.

The bridge structure 30 further comprises a third supporting structure 300, at least one hollow tube 340. The supporting structure 300 comprises pillars 320, a platform 330 and solar panels 360. The pillars 320 are coupled to the platform 130. Specifically, the pillars 320 are inserted inside the platform 130.

The width and the length of the bottom layer 112 of the bridge structure 30 are 30 feet and the height is 3 feet. The width and length of the top layer 114 of the bridge structure 30 is 10 feet and the height is 2 feet. The width and the length of each of the pillars 320 are 4 feet and the height is 16 feet. The width of the platform 330 is 18 feet and the length is 550 feet, the length of the platform 130 is 200 feet and the height of the platform 130 is 4 feet.

In addition, the platform 230 of the supporting structure 200d has the same length as the platform 330, 550 feet. It should be noted that the height of the pillar 220 of the supporting structure 200d is 48 feet. The pillar 220 of the supporting structure 200d is coupled to the base 114 as shown in FIG. 4B. By the above structure, the overall structure may be more stable for double supporting structure. However, the value of the width, length and height is not limited in the present application.

Figure 5:
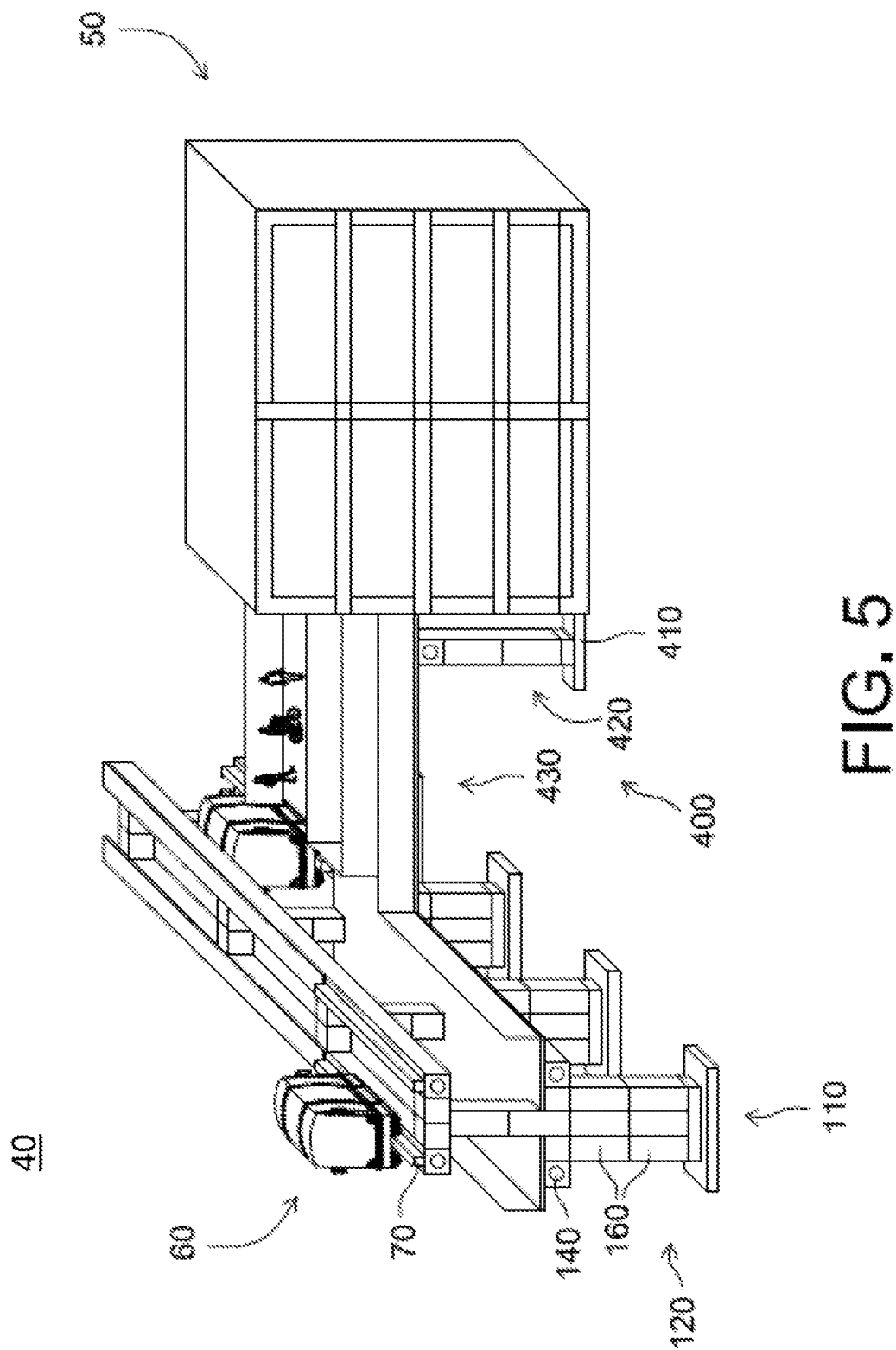
FIG. 5 is a perspective view of a bridge structure according to a sixth embodiment of the present application.

FIG. 5 is a perspective view of a bridge structure 40 according to a sixth embodiment of the present application.

As shown in FIG. 5, the bridge structure 40 may also be coupled to a pedestrian access 400 coupled to a building 50 and any of the bridge structure of the present application. The pedestrian access 400 comprises bases 410, pillars 420 and walk way 430. The length and width of the bases are 10 feet. The length and width of each of the pillar 430 are 4 feet and the height is 16 feet. The walk way 430 and the pillars 420 may have the same structure as the platform and the pillars of any of the embodiment of the present application. By having the pedestrian access 400 coupled to the bridge structure 40 and a building 50, the users may walk or ride on the walk way 430 and enter the train on the bridge structure 40.

Referring to FIG. 3B, FIG. 4B and FIG. 5, a track 70 may further be coupled onto the platform. Specifically, a train 60 is capable of driving on the track 70. The width of the track 70 is 2 feet and the height is 2.5 feet. The length of the track 70 depends on the length of the platform. Specifically, the supporting structure with the track 70 is a light rail transit system. However, the present application is not limited, other vehicles or transportation system such as AGV or magnetic AGV may also drive in the suitable bridge structure of the present application. The bridge structure of present application is designed for H10 vehicular American Association of State Highway and Transportation Officials (AASHTO) highway loading and Cooper E40 American Railway Engineering and Maintenance-of-Way Association (AREMA) railroad loading, representing an approximate 50% reduction versus traditional loading, as an example.

Based on the above, the present application allows users to have a safer bridge structure since the monitors with artificial intelligence may inspect the bridge stability. In other words, the bridge structure of the present application may work as a micro transit for the users. In addition, since the bridge structure of the present application is a truss framing structure, providing a cheaper and environment friendly manufacturing process and a more flexible overall structure as a "structure tree transporter." For example, the bridge structure may have one, two, three or more layers and can have hollow tubes between the trusses for installing the monitors.

Furthermore, since the solar fabrics may also generate energy for the transport system, providing a convenient environment for those vehicles powered by electricity, and also cart support other kinds of transportation system such as maglev or cargo.

It will be apparent to those skilled in the art that various modifications and variations can be made to the structure of the present application without departing from the scope or spirit of the present application. In view of the foregoing, it is intended that the present application cover modifications and variations of this application provided they fall within the scope of the following claims and their equivalents.

What is claimed is:

1. A bridge structure, comprising:
    a first supporting structure comprising:
        a plurality of bases;
        a plurality of first pillars coupled to the plurality of bases, wherein each of the first pillars comprises a plurality of first pillar chords and a plurality of first pillar girders formed as first pillar trusses with the plurality of first pillar chords; and
        a first platform coupled to the plurality of first pillars, wherein the first platform comprises a first supporting plane, a plurality of first platform chords and a plurality of first platform girders formed as first platform trusses with the plurality of first platform chords;
    at least one first hollow tube located between the first pillar trusses or the first platform trusses;
    a first monitor located in the at least one first hollow tube, wherein the first, monitor is, capable of monitoring a bridge stability;
    a second supporting structure comprising:
        a plurality of second pillars coupled to the plurality of bases, wherein each of the second pillars comprises a plurality of second pillar chords and a plurality of second pillar girders formed as second pillar trusses with the plurality of second pillar chords; and
        a second platform coupled to the plurality of second pillars, wherein the second platform comprises a second supporting plane, a plurality of second platform chords and a plurality of second platform girders formed as second platform trusses with the plurality of second platform chords;
    at least one second hollow tube located between the second pillar trusses or the second platform trusses; and
    a second monitor located in the at least one second hollow tube, wherein the second monitor is capable of monitoring a bridge stability.

2. The bridge structure as claimed in claim 1, wherein the first hollow tube is a pneumatic tube.

3. The bridge structure as claimed in claim 1, wherein the first supporting structure further comprises a plurality of solar panels located at the exterior of the plurality of the first pillars.

4. The bridge structure as claimed in claim 1, wherein the first supporting structure further comprises a plurality of solar panels located at the bottom and side surfaces of the first platform.

5. The bridge structure as claimed in claim 1, wherein the first pillar trusses are wrapped by solar fabrics.

6. The bridge structure as claimed in claim 1, wherein the first platform trusses are wrapped by solar fabrics.

7. The bridge structure as claimed in claim 1, wherein the first monitor comprises noise sensor, vibration sensor and se is movement sensor.

8. The bridge structure as claimed in claim 1, wherein the second hollow tube is a pneumatic tube.

9. The bridge structure as claimed in claim 1, wherein the second supporting structure further comprises a plurality of solar panels located at the exterior of the plurality of the second pillars.

10. The bridge structure as claimed in claim 1, wherein the second supporting structure further comprises a plurality of solar panels located at the bottom and side surfaces of the second platform.

11. The bridge structure as claimed in claim 1, wherein the second pillar trusses are wrapped by solar fabrics.

12. The bridge structure as claimed in claim 1, wherein the second platform trusses are wrapped by solar fabrics.

13. The bridge structure as claimed in claim 1, wherein the second monitor comprises noise sensor, vibration sensor and seismic movement sensor.

14. The bridge structure as claimed in claim 1, further comprising:
    a third supporting structure comprising:
        a plurality of third pillars coupled to the first platform, wherein each of the third pillars comprises a plurality of third pillar chords and a plurality of third pillar girders formed as third pillar trusses with the plurality of third pillar chords; and
        a third platform coupled to the plurality of third pillars, wherein the third platform comprises a third supporting plane, a plurality of third platform chords and a plurality of third platform girders formed as third platform trusses with the plurality of third platform chords;
    at least one third hollow tube located between the third pillar trusses or the third platform trusses; and
    a third monitor located in the at least one third hollow tube, wherein the third monitor is capable of monitoring a bridge stability.

15. The bridge structure as claimed in claim 14, wherein the third supporting structure further comprises a plurality of solar panels located at the exterior of the plurality of the third pillars.

16. The bridge structure as claimed in claim 14, wherein the third supporting structure further comprises a plurality of solar panels located at the bottom and side surfaces of the third platform.

17. The bridge structure as claimed in claim 14, wherein the third pillar trusses are wrapped by solar fabrics.

18. The bridge structure as claimed in claim 14, wherein the third platform trusses are wrapped by solar fabrics.

19. The bridge structure as claimed in claim 14, wherein the third monitor comprises noise sensor, vibration sensor and seismic movement sensor.

* * * * *